(12) United States Patent
Sundaresan et al.

(10) Patent No.: US 6,651,058 B1
(45) Date of Patent: Nov. 18, 2003

(54) SYSTEM AND METHOD OF AUTOMATIC DISCOVERY OF TERMS IN A DOCUMENT THAT ARE RELEVANT TO A GIVEN TARGET TOPIC

(75) Inventors: Neelakantan Sundaresan, San Jose, CA (US); Jeonghee Yi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,758

(22) Filed: Nov. 15, 1999

(51) Int. Cl.$^7$ .............................................. G06F 17/30
(52) U.S. Cl. .................. 707/6; 707/3; 707/5; 707/100; 707/102; 706/45; 706/50
(58) Field of Search .................... 707/1–10, 100–104.1, 707/200–205, 501.1, 512–515; 709/200–235; 706/45–50

(56) References Cited

U.S. PATENT DOCUMENTS

| | | | | |
|---|---|---|---|---|
| 5,642,502 A | * | 6/1997 | Driscoll ...................... | 707/200 |
| 5,692,107 A | * | 11/1997 | Simoudis et al. ............. | 706/12 |
| 5,745,360 A | | 4/1998 | Leone et al. ................. | 364/140 |
| 5,819,260 A | | 10/1998 | Lu et al. ......................... | 707/3 |
| 5,857,179 A | | 1/1999 | Vaithyanathan et al. ....... | 707/2 |
| 5,933,822 A | * | 8/1999 | Braden-Harder et al. ...... | 707/3 |
| 6,006,221 A | * | 12/1999 | Liddy et al. .................... | 704/2 |
| 6,122,647 A | * | 9/2000 | Horowitz et al. .............. | 707/3 |
| 6,134,532 A | * | 10/2000 | Lazarus et al. ................ | 705/1 |

(List continued on next page.)

OTHER PUBLICATIONS

R. Larson, "Bibliometrics of the World Wide Web: An Exploratory Analysis of the Intellectual Structure of Cyberspace," the Proceedings of the 1966 American Society for Information Science Annual Meeting, also published as a technical report, School of Information Management and Systems, University of California, Berkeley, 1996, which is published on the Word Wide Web at URL: http://sherlock-.sims.berkeley.edu/docs/asis96/asis96.html.

(List continued on next page.)

Primary Examiner—Srirama Channavajjala
(74) Attorney, Agent, or Firm—Samuel A. Kassatly

(57) ABSTRACT

A computer program product is provided as an automatic mining system to discover terms that are relevant to a given target topic from a large databases of unstructured information such as the World Wide Web. The operation of the automatic mining system is performed in three stages: The first stage is carried out by a new terms discoverer for discovering the terms in a document, the second stage is carried out by a candidate terms discoverer for discovering potentially relevant terms, and the third stage is carried out by a relevant terms discoverer for refining or testing the discovered relevance to filter false relevance. The new terms discoverer includes a system for the automatic mining of patterns and relations, a system for the automatic mining of new relationships, and a system for selecting new terms from relations. In one embodiment, the system for the automatic mining of patterns and relations identifies a set of related terms on the WWW with a high degree of confidence, using a duality concept, and includes a terms database and two identifiers: a relation identifier and a pattern identifier. The system for the automatic mining of new relationships includes a database a knowledge module and a statistics module. The knowledge module includes a stemming unit, a synonym check unit, and a domain knowledge check unit. The candidate terms discoverer includes a metadata extractor, a document vector module, an association module, a filtering module, and a database. The relevant terms discoverer includes a stop word filter and a system for the automatic construction of generalization—specialization hierarchy of terms comprised of a terms database, an augmentation module, a generalization detection module, and a hierarchy database.

22 Claims, 9 Drawing Sheets

U.S. PATENT DOCUMENTS

| | | | |
|---|---|---|---|
| 6,175,829 B1 * | 1/2001 | Li et al. .................... | 382/230 |
| 6,182,091 B1 * | 1/2001 | Pitkow et al. .............. | 707/102 |
| 6,185,550 B1 * | 2/2001 | Snow et al. .................. | 707/1 |
| 6,377,947 B1 * | 4/2002 | Evans .......................... | 707/5 |
| 6,389,436 B1 * | 5/2002 | Chakrabarti et al. .......... | 707/3 |

OTHER PUBLICATIONS

D. Gibson et al., "Inferring Web Communities from Link Topology," Proceedings of the $9^{th}$ ACM. Conference on Hypertext and Hypermedia, Pittsburgh, PA, 1998.

D. Turnbull. "Bibliometrics and the World Wide Web," Technical Report University of Toronto, 1996.

K. McCain, "Mapping Authors in Intellectual Space: A technical Overview," Journal of the American Society for Information Science, 41(6):433–443, 1990.

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLDB, Santiago, Chile, Sep. 1994.

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al. "Focused Crawling: A New Approach to Topic–Specific Web Resource Discovery," Proc. of The $8^{th}$ International World Wide Web Conference, Toronto, Canada, May 1999.

B. Huberman et al., "Strong Regularities in Word Wide Web Surfing," Xerox Palo Alto Research Center.

A. Hutchunson, "Metrics on Terms and Clauses," Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Swizerland, 1995.

W. Li et al., Facilitating comlex Web queries through visual user interfaces and query relaxation, published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 1999.

S. Soderland. Learning to Extract Text–based Information from the World Wide Web, American Association for Artificial Intelligence (www.aaai.org), pp. 251–254.

G. Plotkin. A Note Inductive Generalization, pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregon.

R. Kumar et al., "Trawling the Web for Emerging Cyber-Communities," published on the Word Wide Web at URL: http://www8.org/w8–papers/4a–search–mining/trawling/trawling.html as of Nov. 13, 1999.

"Acronym Finder", published on the Word Wide Web at URL:http://acronymfinder.com/ as of Sep. 4, 1999.

* cited by examiner

SYSTEM AND METHOD OF AUTOMATIC DISCOVERY OF TERMS IN A DOCUMENT THAT ARE RELEVANT TO A GIVEN TARGET TOPIC

CROSS-REFERENCE TO RELATED APPLICATIONS

This application relates to U.S. patent applications Ser. No. 09/440,625, is now U.S. Pat. No. 6,385,629 titled "System and Method for the Automatic Mining of Acronym-expansion Pairs Patterns and Formation Rules", Ser. No. 09/439,379, now pending titled "System and Method for the Automatic Mining of Patterns and Relations", Ser. No. 09/440,203, now pending titled "System and Method for the Automatic Construction of Generalization-Specialization Hierarchy of Terms", Ser. No. 09/440,602, titled "System and Method for the Automatic Recognition of Relevant Terms by Mining Link Annotations", and Ser. No. 09/440,626, is now pending titled "System and Method for the Automatic Mining of New Relationships", all of which are assigned to, and were filed by the same assignee as this application on even date herewith, and are incorporated herein by reference in their entirety.

FIELD OF THE INVENTION

The present invention relates to the field of data mining, and particularly to a software system and associated methods for automatically discovering terms that are relevant to a given target topic from a large databases of unstructured information such as the World Wide Web (WWW). More specifically, the present invention relates to the automatic and iterative recognition of relevant terms by association mining and refinement of co-occurrences.

BACKGROUND OF THE INVENTION

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search engines. As the web spiders visit web pages, they could look for, and learn pieces of information that would otherwise remain undetected.

Current search engines are designed to identify pages with specific phrases and offer limited search capabilities. For example, search engines cannot search for phrases that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. hftp://sherlock.sims.berkeley.edu/docs/asis96/asis96.html; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of related information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns.

Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: http://www8.org/w8-papers/4a-search-mining/trawling/trawling.html) as of Nov. 13, 1999; and S. Chakrabarti et al. "Focused Crawling: A New Approach to Topic-Specific Web Resource Discovery," Proc. of The $8^{th}$ International World Wide Web Conference, Toronto, Canada, May 1999.

Furthermore, not only is the quantity of WWW material increasing, but the types of digitized material are also increasing. For example, it is possible to store alphanumeric texts, data, audio recordings, pictures, photographs, drawings, images, video and prints. However, such large quantities of materials is of little value unless it the desired information is readily retrievable. While, as discussed above, certain techniques have been developed for accessing certain types of textual materials, these techniques are at best moderately adequate for accessing graphic, audio or other specialized materials. Consequently, there are large bodies of published materials that remain inaccessible and thus unusable or significantly under utilized.

A common technique for accessing textual materials is by means of a "keyword" combination, generally with boolean connections between the words or terms. This searching technique suffers from several drawbacks. First, the use of this technique is limited to text and is not usable for other types of material. Second, in order to develop a searchable database of terms, the host computer must usually download the entire documents, which is a time-consuming process, and does not normally provide an association between related terms and concepts.

Exemplary work in scalable data mining technology, is described in the following references: R. Agrawal et al., "Mining Association Rules Between Sets of Items in Large Databases, Proceedings of ACM SIGMOD Conference on Management of Data, pp. 207–216, Washington, D.C., May 1993; R. Agrawal et al., "Fast Algorithms for Mining Association Rules," Proc. of the 20th Int'l Conference on VLDB, Santiago, Chile, September 1994; and S. Brin, "Extracting Patterns and Relations from the World Wide Web," WebDB, Valencia, Spain, 1998, supra. Such work has been successfully applied to identify co-occurring patterns in many real world problems including market basket analysis, cross-marketing, store layout, and customer segmentation based on buying patterns.

Early work on applying association to texts can be found in FACT system, described in R. Feldman et al., "Mining Associations in Text in the Presence of Background Knowledge," Proceedings of the Second International Conference on Knowledge Discovery and Data Mining, Aug. 2–4, 1996, Portland, Oreg. It discovers associations amongst only keywords representing the topics of the document. The FACT system assumes that a set of predefined keywords describing the document is available. Such an assumption might not be too unrealistic for a set of well annotated documents or for a classes of documents for which text categorization system automatically produces reasonably good annotations with keywords. However, the assumption generally does not hold true for WWW pages since a major portion of the WWW pages is not well annotated. Annotation of the WWW pages by general text categorization techniques can perform poorly, in that these techniques use natural language processing (NLP) that expect grammatically correct sentences, and WWW pages frequently consist of irregular sentences.

There is therefore a great and still unsatisfied need for a software system and associated methods for the automatic discovery of terms that are relevant to a given target topic from the World Wide Web, with a high degree of accuracy and confidence.

SUMMARY OF THE INVENTION

In accordance with the present invention, a computer program product is provided as an automatic mining system to discover terms that are relevant to a given target topic from a large databases of unstructured information such as the World Wide Web (WWW). The system and methods enable the automatic and iterative recognition of relevant terms by association mining and refinement of co-occurrences.

The operation of the automatic mining system is performed in three stages: The first stage is carried out by a new terms discoverer for discovering the terms in a document $d_i$; the second stage is carried out by a candidate terms discoverer for discovering potentially relevant terms; and the third stage is carried out by a relevant terms discoverer for refining or testing the discovered relevance to filter false (or insignificant) relevance.

The new terms discoverer includes a system for the automatic mining of patterns and relations, a system for the automatic mining of new relationships, and a system for selecting new terms from relations. In one embodiment, the system for the automatic mining of patterns and relations identifies a set of related terms on the WWW with a high degree of confidence, using a duality concept, and includes a terms database and two identifiers: a relation identifier and a pattern identifier.

The system for the automatic mining of new relationships enables the discovery of new relationships by association mining and refinement of co-occurrences, using automatic and iterative recognition of new binary relations through phrases that embody related pairs. The system for the automatic mining of new relationships is comprised of a database a knowledge module and a statistics module. In one embodiment, the knowledge module includes one or more of the following units: a stemming unit, a synonym check unit, and a domain knowledge check unit. New terms are obtained from relations discovered by the system for automatic mining of patterns and relations of the same kind by selecting an item (or a column) of a pair.

The candidate terms discoverer is comprised of a metadata extractor, a document vector module, an association module, a filtering module, and a database for storing the mined sets of relevant terms. The relevant terms discoverer includes a stop word filter and a system for the automatic construction of generalization-specialization hierarchy of terms. The system for the automatic construction of generalization-specialization hierarchy of terms includes a terms database, an augmentation module, a generalization detection module, and a hierarchy database.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

Figure 1:
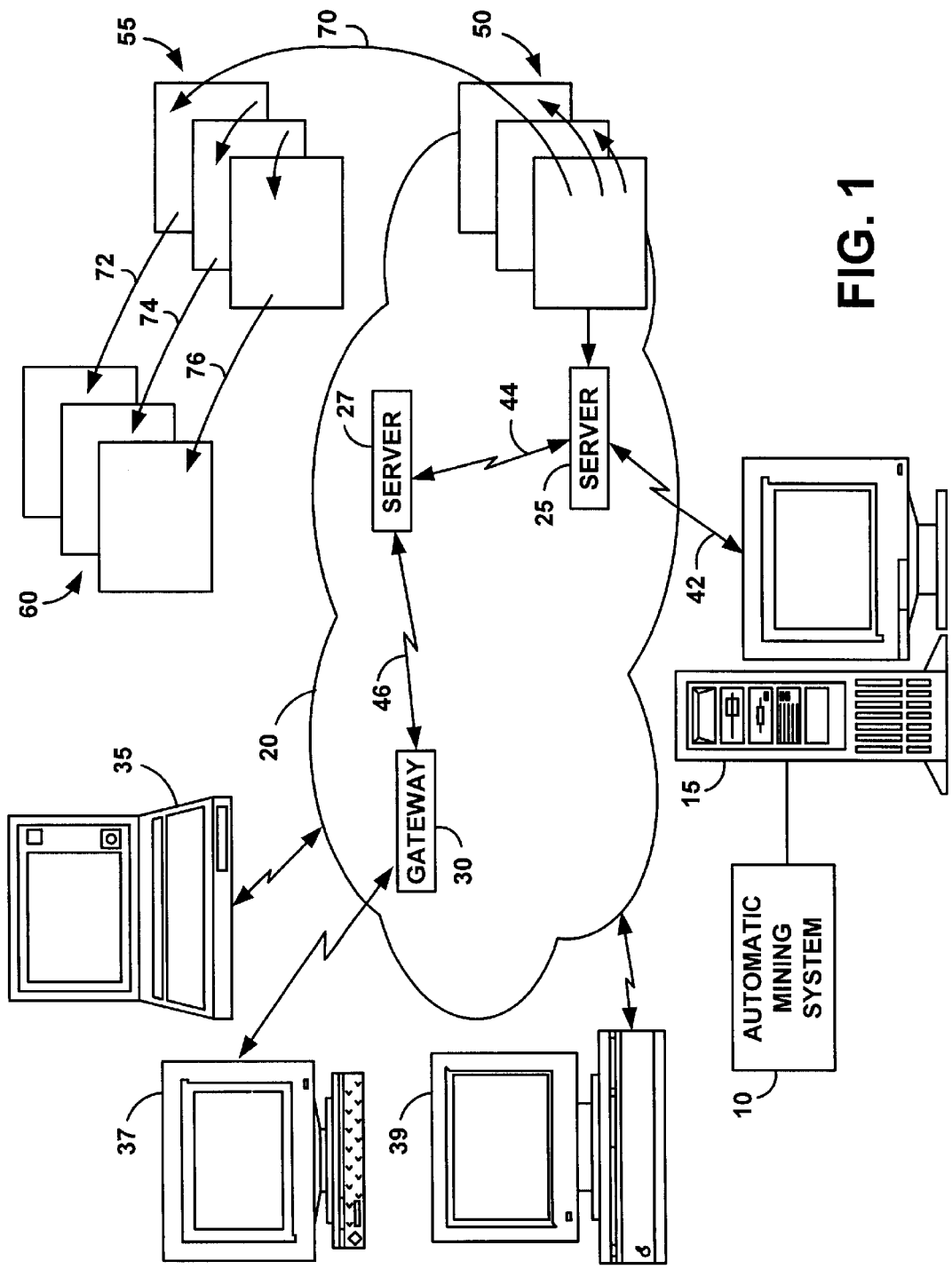
FIG. 1 is a schematic illustration of an exemplary operating environment in which the automatic mining system of the present invention may be used.

The following definitions and explanations provide background information pertaining to the technical field of the present invention, and are intended to facilitate the understanding of the present invention without limiting its scope:

Crawler or spider: A program that automatically explores the World Wide Web by retrieving a document and recursively retrieving some or all the documents that are linked to it.

Gateway: A standard interface that specifies how a web server launches and interacts with external programs (such as a database search engine) in response to requests from clients.

Hypertext System: A computer-based informational system in which documents (and possibly other types of data entities) are linked together via hypertext links to form a user-navigable web.

Hypertext Link (or hyperlink): A reference link from some point in one hypertext document to another point in another document or another place in the same document. When a user activates the link (e.g. by clicking on it with the mouse) the browser will display the destination of the link.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (Hypertext Transfer Protocol): Standard WWW client-server protocol used for the exchange of information (such as HTML documents, and client requests for such documents) between a web browser and a web server. HTTP includes several different types of messages that can be sent from the client to the server to request different types of server actions.

Internet: A collection of interconnected public and private computer networks that are linked together with routers by a set of standards protocols to form a global, distributed network.

Metadata (or annotation) of a hyperlink: Description of a hyperlink provided by the page that contains it. Ideally, it describes the concept of the linked page. This description may be found, for example, in elements around a hyperlink's anchor tags. Such elements may include attribute values or free text surrounding the hyperlink. Of these elements, anchor texts seem to be the most descriptive and frequent, and are believed to constitute serious candidates for use as annotations.

Server: A software program or a computer that responds to requests from a web browser by returning ("serving") web documents.

SGML (Standard Generalized Markup Language): A generic markup language for representing documents. SGML is an International Standard that describes the relationship between a document's content and its structure. SGML allows document-based information to be shared and re-used across applications and computer platforms in an open, vendor-neutral format. SGML is defined in "ISO 8879:1986 Information processing—Text and office systems—Standard Generalized Markup Language (SGML) ", an ISO standard produced by JTC 1/SC 18 and amended by "Amendment 1:1988".

URL (Uniform Resource Locator): A unique address which fully specifies the location of a content object on the Internet. The general format of a URL is protocol://server-address/path/filename.

XML (Extensible Markup Language): A meta-language that provides a framework (or set of rules) to specify domain specific languages. Sometimes described as a simplified dialect of SGML suitable for use on the Word-Wide Web, it gives rise to such markup languages as SMIL (Synchronized Multimedia Integration Language), CML (Chemical Markup Language), MML (Mathematics Markup Language), etc.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

FIG. 1 portrays the overall environment in which automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. Although the automatic mining system 10 will be described in connection with the WWW, it should be clear that the automatic mining system 10 can be used with a stand-alone database of terms and associated meanings that may have been derived from the WWW and/or another source.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
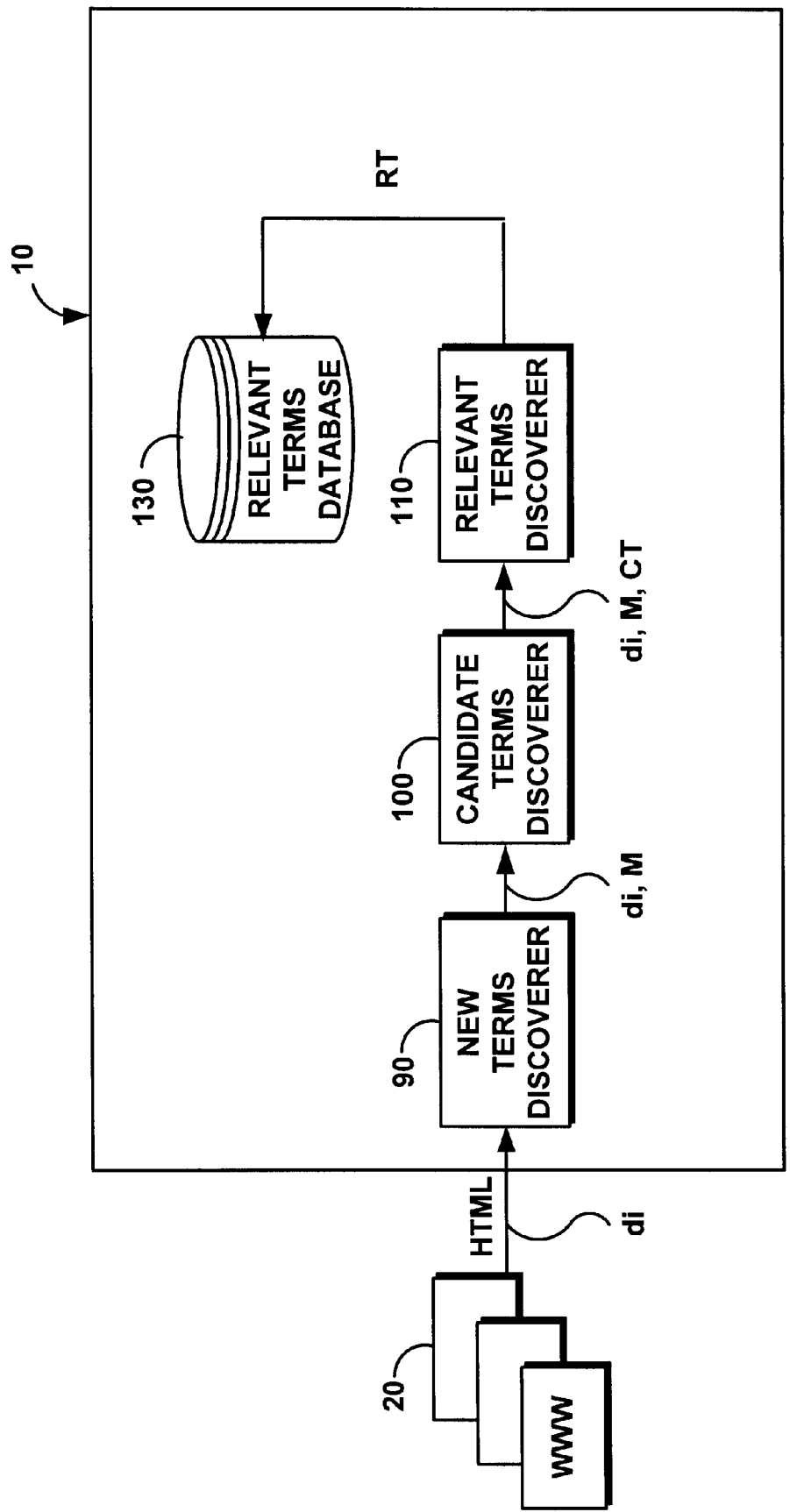
FIG. 2 is a block diagram of the automatic mining system of FIG. 1.

The automatic mining system 10 will now be described in more detail with further reference to FIG. 2. The automatic mining system 10 includes a computer program product such as a software package, which is generally comprised of a new terms discoverer 90, a candidate terms discoverer 100, a relevant terms discoverer 110, and a relevant terms database 130. The relevant terms database 130 stores the relevant terms mined by the automatic mining system 10. In an alternative design, the relevant terms database 130 does not form part of the automatic mining system 10.

In one embodiment, a crawler that resides in the host server 15, visits and downloads every web page or document $d_i$ on the WWW at periodic intervals, for example about once a month. During such visits, the crawler downloads all or selected sections of the document $d_i$ to the new terms discoverer 90 which discovers the terms existing in the document $d_i$, and which limits their scope by providing a preliminary selection of those terms that are relevant to the target topic of interest. For example, in the context of a grocery shopping, the new terms discoverer 90 limits the terms in the database to grocery items by excluding or filtering non-grocery items such as hardware.

Using the terms mined by the new terms discoverer 90, the candidate terms discoverer 100 identifies potentially relevant terms by the frequency of their co-occurrence. The relevant terms discoverer 110 filters the terms mined by the candidate terms discoverer 100 to determine the accuracy of these terms and their meaningful (or close) relevance to the target concept. This is accomplished by eliminating non-meaningful co-occurring terms. For example, banana is a "major" or frequent term that occurs in a significant number of grocery shopping carts (i.e., banana is frequently purchased), and has no particular relevance to other co-occurring terms (i.e., to other purchased grocery items). As a result, the relevant terms discoverer 110 can eliminate banana from the list of closely relevant terms. The terms resulting from the new terms discoverer 90 are considered to be relevant and are stored in the relevant terms database 130.

Figure 3:
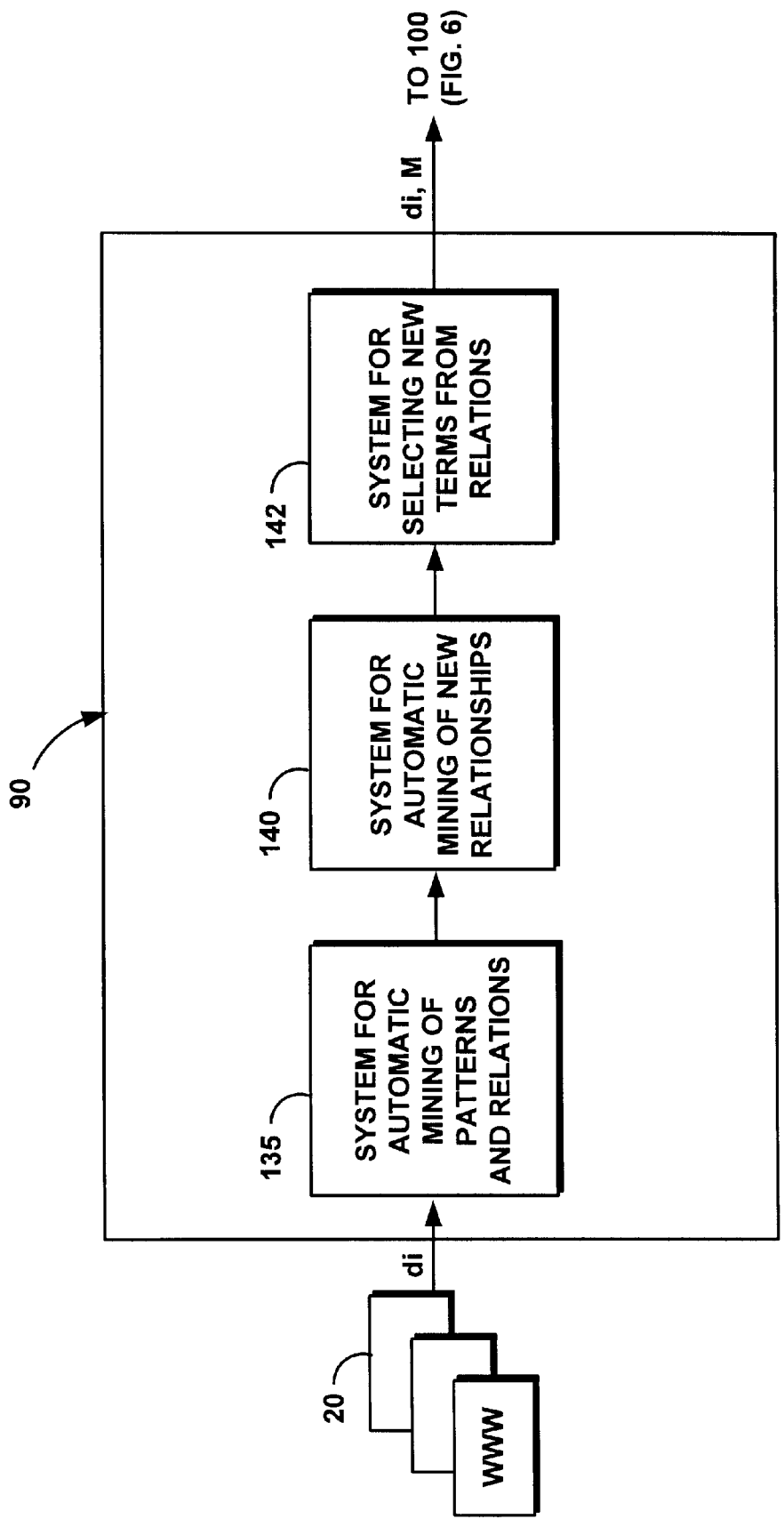
FIG. 3 is a block diagram of a new terms discoverer that forms part of the automatic mining system of FIG. 2.
Figure 4:
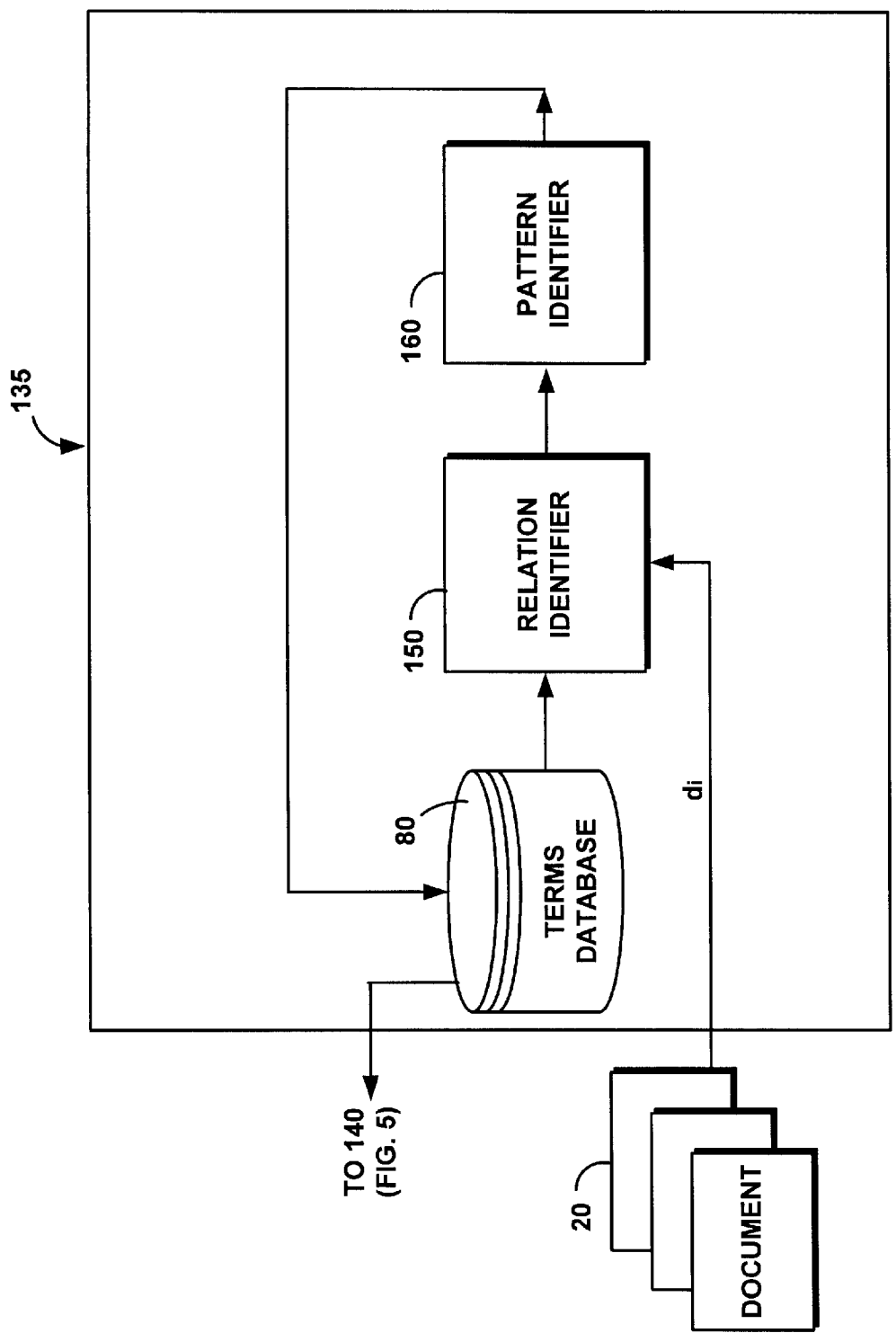
FIG. 4 is a detailed block diagram of a system for the automatic mining of patterns and relations that forms part of the new terms discoverer of FIG. 2.
Figure 5:
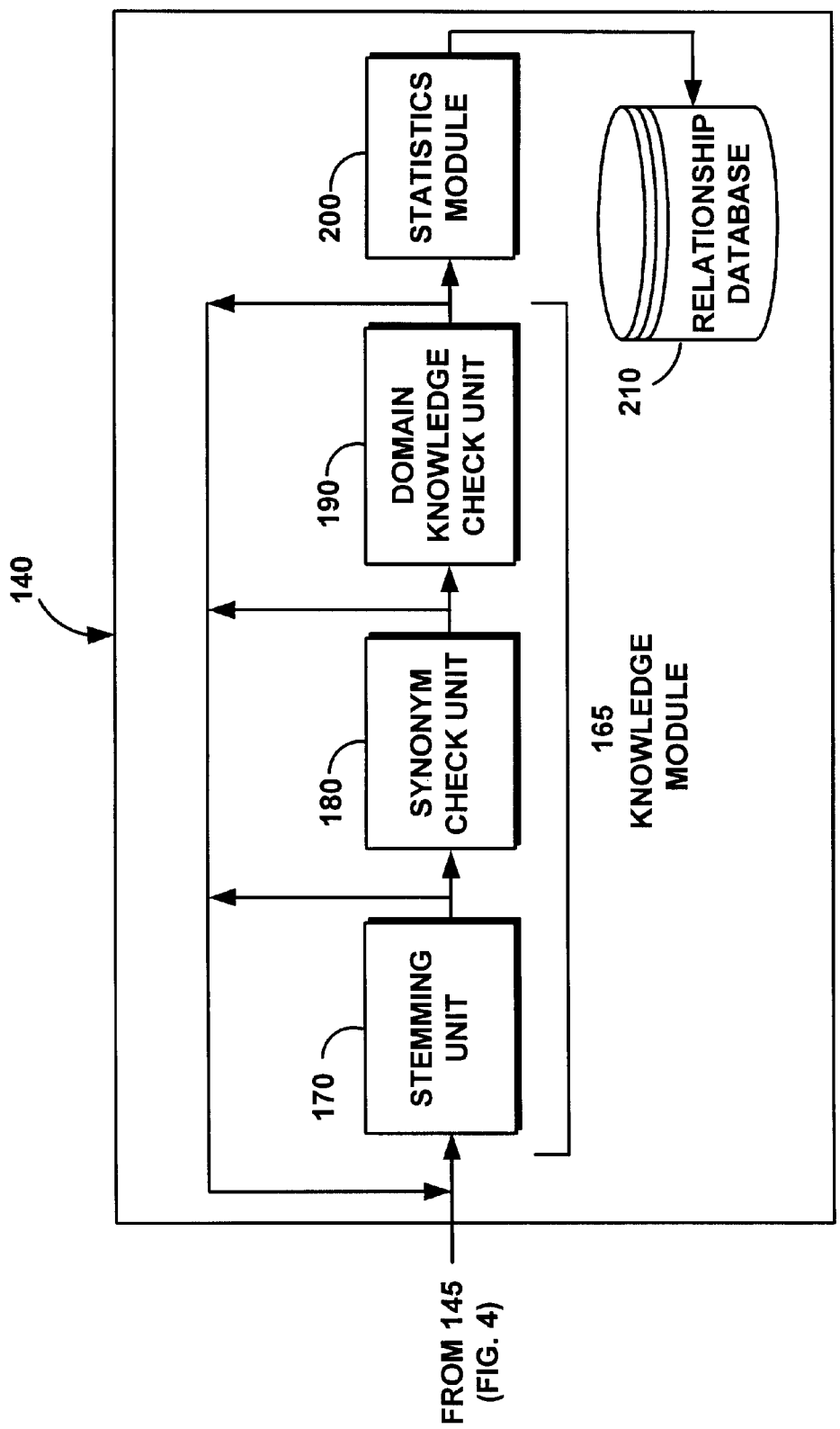
FIG. 5 is a detailed block diagram of a system for the automatic mining new relationships that forms part of the new terms discoverer of FIG. 2.

Having described the main components of the automatic mining system 10, its operation will now be further explained in connection with FIGS. 3 through 8. The first stage of the operation is carried out by the new terms discoverer 90 which is illustrated in FIGS. 3, 4 and 5. The new terms discoverer 90 defines the terms that need to be examined for their relevance to a target topic (or concept). As used herein a target topic can be defined as a description of the cluster of the topic's instances in a database. For a given target topic and a database of HTML documents discovering a relevant topic is to discover a topic whose cluster significantly overlaps with the target topic's cluster. In other words, a significant number of the relevant topic's instances belong to the target topic's cluster. The significance is determined by a user-defined threshold. In the illustration described herein, relevance is defined in terms of co-occurrence of terms.

Though it is possible to use all the terms in the documents $d_i$ in the database 20 (i.e., the World Wide Web), the resulting quality might not be acceptable because the full text of the documents $d_i$ includes noise and unrelated terms. One goal of the automatic mining system 10 is to increase the accuracy of the relevance between terms by eliminating unnecessary noise and unrelated terms.

To this end, the new terms discoverer 90 generally includes a system 135 for the automatic mining of patterns and relations, a system 140 for the automatic mining of new relationships, and a system for selecting new terms from relations 142. In this example, the system 135 identifies a set of related terms on the WWW, with a high degree of confidence, using a duality concept. Duality problems arise, for example, when a user attempts to identify a pair of related phrases such as (book, author); (name, email); (acronym, expansion); or similar other relations. The system 135 addresses the duality problems by iteratively refining mutually dependent approximations. Specifically, the system 135 iteratively refines (i) pairs of terms that are related in a specific way, and (ii) the patterns of their occurrences in web pages, i.e., the ways in which the related phrases are marked in the web pages. The system 135 runs in an iterative fashion for continuously and incrementally refining the patterns and patterns.

FIG. 4 illustrates an exemplary system 135 for the automatic mining of patterns and relations, which is comprised of a terms database 80 and two identifiers: a relation identifier 150 and a pattern identifier 160. The terms database 80 contains sets of relations that have been identified by the relation identifier 150 as well as sets of patterns that have already been identified by the pattern identifier 160. Initially, the terms database 80 begins with small seed sets of relations and patterns that are continuously and iteratively broadened by the system 135. A more complete description of the system 135 can be found in U.S. patent application Ser. No. 09/439,379, titled "System and Method for the Automatic Mining of Patterns and Relations", which is incorporated herein by reference.

FIG. 5 illustrates an exemplary system 140 for the automatic mining of new relationships that uses the automatic and iterative recognition of new binary relations through phrases that embody related pairs by applying lexicographic and statistical techniques to classify the relations, and further by applying a minimal amount of domain knowledge of the relevance of the terms and relations. New terms are obtained from relations discovered by the system for automatic mining of patterns and relations of the same kind by selecting an item (or a column) of a pair. For example, for the purpose of identifying relevant products, one can obtain all the product names from the product item (or column) of (company, product) pairs of a production relationship.

The system 140 includes a database a knowledge module 165 and a statistics module 200. Using the document $d_i$, the previously identified sets of pairs and relations, the knowledge module 165 inquires whether or not a new relation exists in the set of relations. If the relation is deemed not to exist, the knowledge module 165 forwards the pair and the derived relation to the statistics module 200. The derived relation is stored in a relationship database 210. If the knowledge module 165 determines that the relation already exists, the knowledge module 165 terminates the mining progress and proceeds to mine additional pairs and relations.

In one embodiment, the knowledge module 165 includes one or more of the following units: a stemming unit 170, a synonym check unit 180, and a domain knowledge check unit 190. The stemming unit 170 determines if the relation being analyzed shares a common root with a previously mined relation. The synonym check unit 180 identifies the synonyms of the relation. The domain knowledge check unit 190 considers the content of the document $d_i$ or semantic meaning or categorization of each item in the relation for indications that would further clarify the relationship being mined. The statistics module 200 optimizes and increases the confidence level in the relationship. A more complete description of the system 140 can be found in U.S. patent application Ser. No. 09/440,626, is now pending titled "System and Method for the Automatic Mining of New Relationships", which is incorporated herein by reference.

Figure 6:
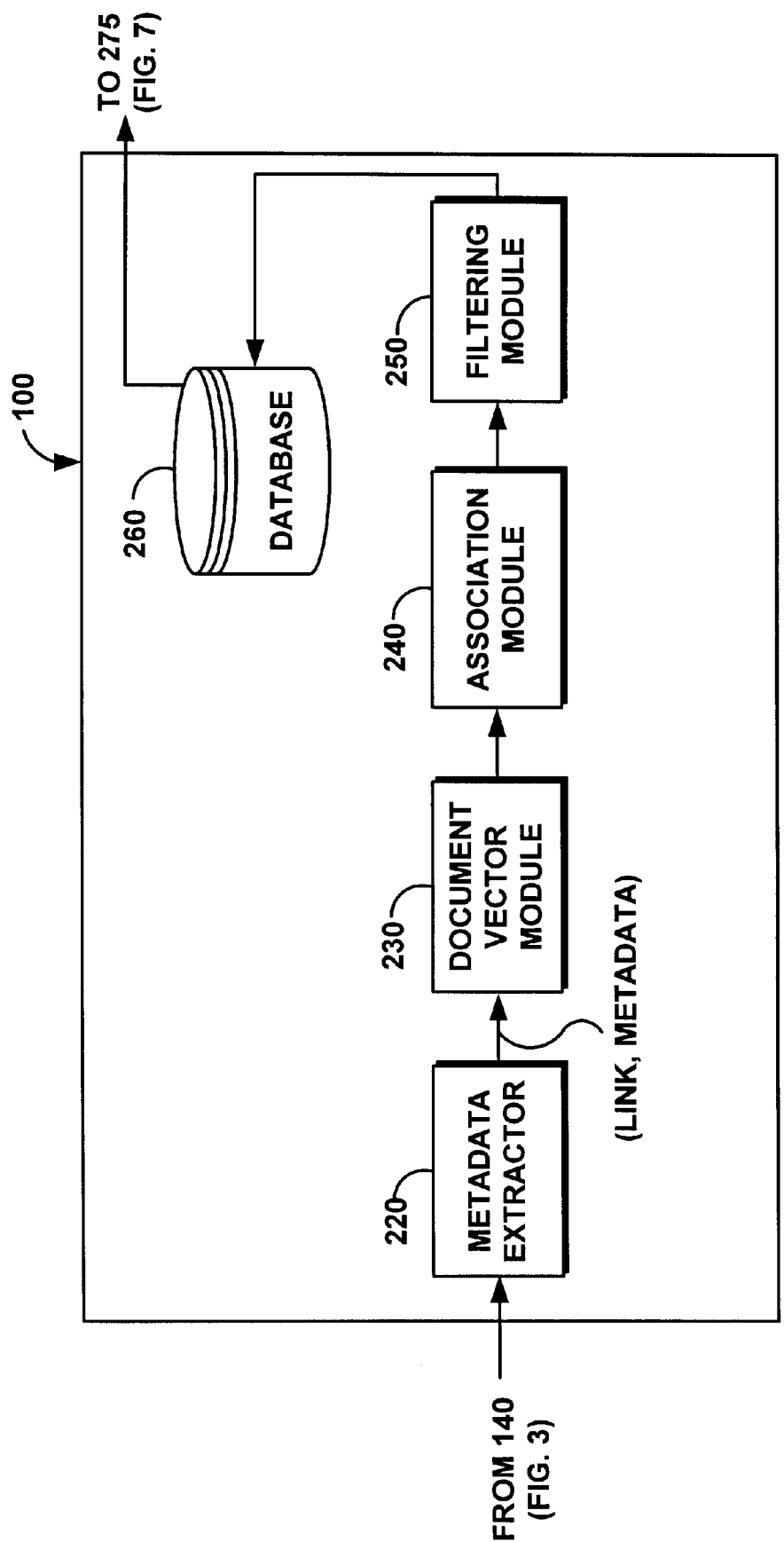
FIG. 6 is a detailed block diagram of a candidate terms discoverer that forms part of the automatic mining system of FIG. 2.

The second stage of the operation of the automatic mining system 10 is carried out by the candidate terms discoverer 100 which is illustrated in FIG. 6. The candidate terms discoverer 100 presumes that a hypertext document that discusses a certain target topic references related concepts using hyperlinks. Based on this premise, the candidate terms discoverer 100 aims at learning frequently co-occurring and thus potentially relevant terms by finding associations rules among the terms appearing on the hyperlink metadata of the web pages. The terms that are identified by strong association rules are likely to be relevant to the target topic, and therefore form a set of potentially relevant terms or candidate terms.

One feature of the candidate terms discoverer 100 is to design metrics that address the learning process of relevant terms by finding associations among terms that appear as link annotations, and to minimize the association errors resulting from one or more of the following sources: false associations governed by the rules of association algorithms; the unknowability of the optimal metric of significance for a domain; and the large amount of noise contained within the web pages.

FIG. 6 illustrates an exemplary candidate terms discoverer 100, which is comprised of a metadata extractor 220, a document vector module 230, an association module 240, and a filtering module 250. The candidate terms discoverer 100 further includes a database 260 for storing the mined sets of relevant terms. The set of relevant terms is continuously and iteratively broadened by the candidate terms discoverer 100.

The metadata extractor 220 identifies all the hypertext link metadata in the document di. Whereupon, the document vector module 230 creates a document vector for each document $d_i$. In a preferred embodiment, the document vector module 230 does not list duplicate terms or the frequency of occurrence of all the terms. Rather, the association module 240 measures the number of documents that contain the terms, regardless of the frequency of occurrence of the terms within a single document $d_i$. Such measurement enables the association module 240 to perform the necessary statistical analyses.

The filtering module 250 filters strong association rules of which relevance surpasses a user specified threshold. For example, a set of strong association rules R can be expressed as follows:

$$R=\{t \rightarrow T | rel(t \rightarrow =T)>c\},$$

where t is a term and T is a topic term, rel (t→T) is a relevance metric of the association rule such as support of confidence, and c is a user-specified threshold. From R, a set of candidate terms CT is extracted as follows:

$$CT=\{ct \rightarrow (ct \rightarrow T)\epsilon\},$$

i.e., for all association rules ct → T in R. The terms in such association rule are candidate terms. A more complete description of the system 135 can be found in U.S. patent application Ser. No. 09/440,602, is now pending titled A System and Method for the Automatic Recognition of Relevant Terms by Mining Link Annotations", which is incorporated herein by reference.

Figure 7:
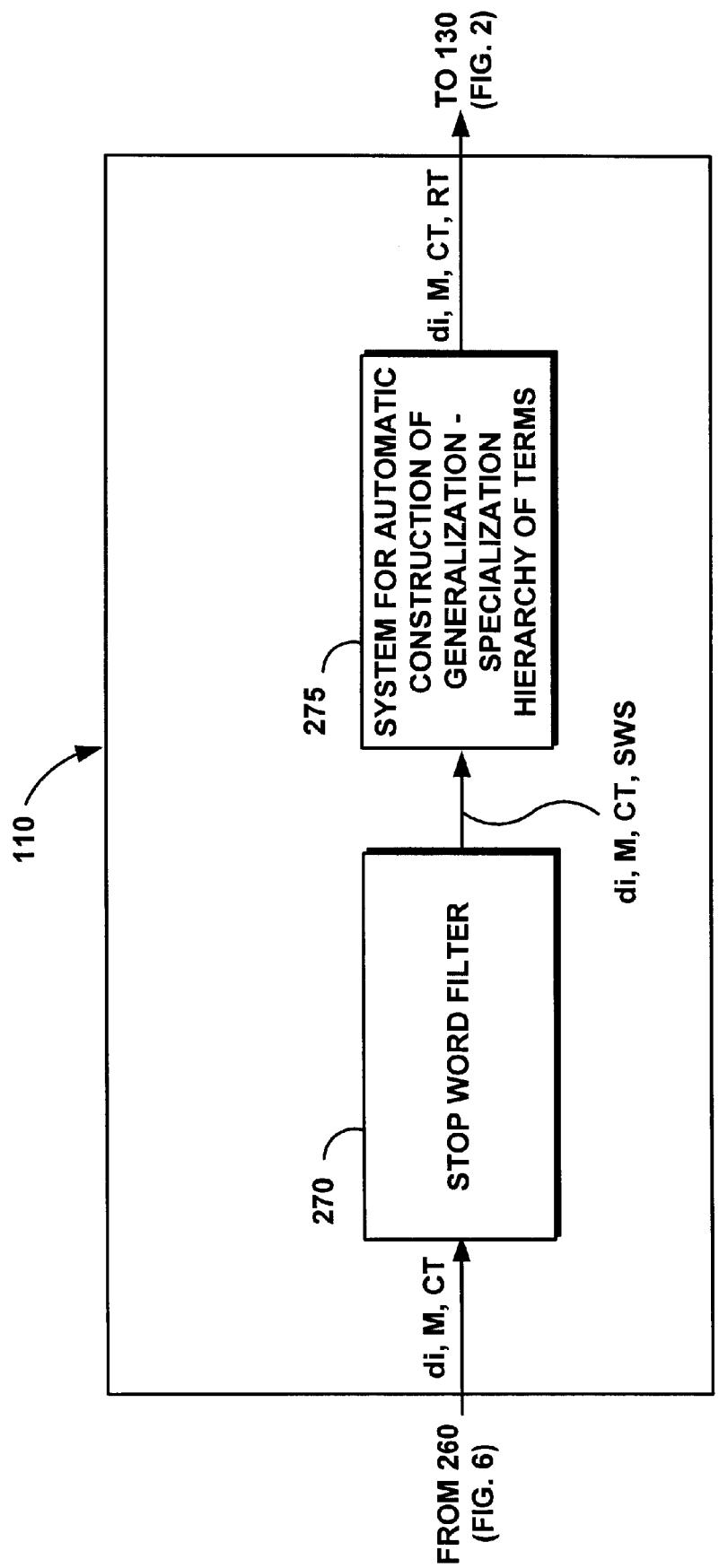
FIG. 7 is a block diagram of a relevant terms discoverer that forms part of the automatic mining system of FIG. 2.
Figure 8:
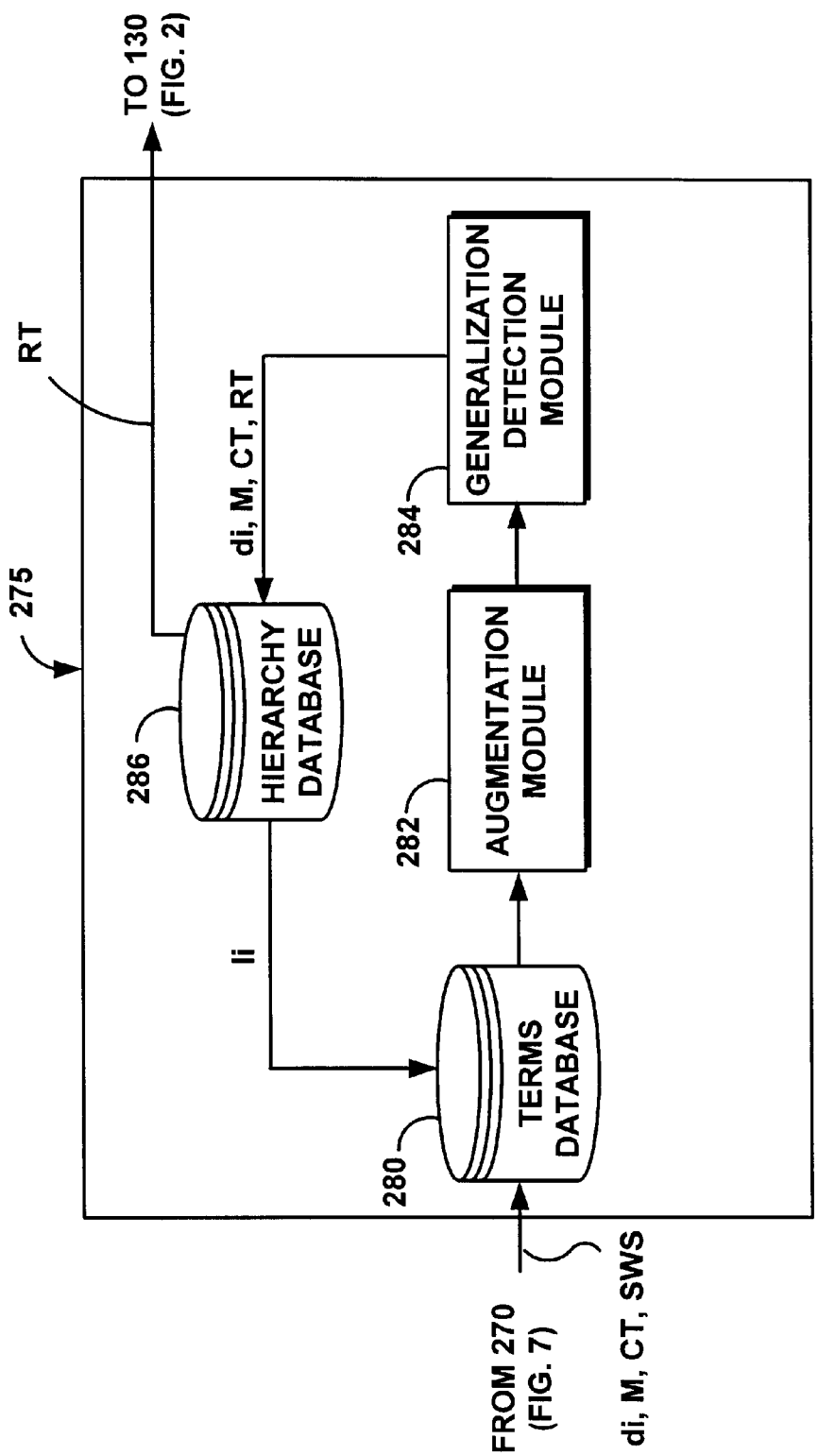
FIG. 8 is a detailed block diagram of a system for the automatic construction of generalization-specialization hierarchy of terms that forms part of the automatic mining system of FIG. 2.

The third stage of the operation of the automatic mining system 10 is carried out by the relevant terms discoverer 110 which is illustrated in FIGS. 7, 8. the relevant terms discoverer 110 compensates for the presence of false association among the candidate terms and the target topic, and aims at retaining only or principally the clearly relevant terms.

To this end, the relevant terms discoverer 110 generally includes a stop word filter 270 and a system 275 for the automatic construction of generalization-specialization hierarchy of terms. In this example, the stop word filter 270 excludes known stop words from the set of candidate terms (CT) developed by the candidate terms discoverer 100. The stop word set (SWS) contains words that bear no or little relevance to the target topic and appear with a high frequency in most of the documents $d_i$. Exemplary stop words are: api, com, edu, faq, free, ftp, gif, html, http, ieee, li, map, mime, mpeg, ol, org, site, tr, toc, ul, url, web, www, and so forth.

The system 275 for the automatic construction of generalization-specialization hierarchy of terms builds a relevance model based upon a generalization-specialization hierarchy. Initially, starting with only the target topic, the relevance model is progressively constructed by new terms and the generalization relationship between the new terms and the existing terms in the relevance model. A generalization relationship between a new candidate term (Ct) and a term in the relevance model (rt), is added to the relevance model if the taxonomy declares the candidate term (ct) to be a specialization of the term in the relevance model (rt).

In addition to the specialization of relevant terms, the Least General Generalization (LGG) terms in the relevance model are added to the relevance model, if the LGG is not overgeneralized. A generalized term by LGG is said to be overgeneralized, if the co-occurrence between the generalized term and its specialization in the relevance model is below a predetermined threshold. As an example, in a random sample set (S) of documents the co-occurrence of the LGG and a term (rt) in the relevance model that is a specialization of the LGG is measured by the joint probability of the LGG and the term (rt). If the joint probability of the LGG and the relevance model in the set (S) is less than a user provided threshold (t), i.e. pS(LGG, rt)<t, the LGG is overgeneralized, and the LGG is not added to the relevance model. Based on this relevance model, a candidate term is determined to be relevant to the target topic if the candidate term is a specialization of a term in the relevance model.

FIG. 8 illustrates an exemplary system 275 for the automatic construction of generalization-specialization hierarchy of terms that enables the automatic and iterative recognition of relevant terms using, for example, the Least General Generalization (LGG) model. The system 275 is generally comprised of a terms database 280, an augmentation module 282, a generalization detection module 284, and a hierarchy database 286. The terms database 280 stores the sets of terms and their associated meanings (Mi), and the hierarchy database 286 stores the mined generalization hierarchy. The set of terms includes the set of mined generalizations, and the generalization hierarchy is defined by a set of edges and a set of terms.

One function of the augmentation module 282 is to update the set of terms knowing the terms stored in the terms database 280. This feature is implemented by a generalization technique such as the "Least General Generalization" or LGG model. The generalization detection module maps the LGG sets that are stored in the terms database 280 and the LGG terms that are derived by the augmentation module 282, updates the set of edges (or hierarchical or generalization relationships), and derives a generalization hierarchy. In operation, the system 275 begins with no predefined taxonomy of the terms, and the LGG model derives a generalization hierarchy, modeled as a Directed Acyclic Graph (DAG), from the set of terms. The generalization hierarchy maps the generalization and specialization relationships between the terms. A more complete description of the system 140 can be found in U.S. patent application Ser. No.

09/440,203, is now pending titled "System and Method for the Automatic Construction of Generalization-Specialization Hierarchy of Terms", which is incorporated herein by reference.

Figure 9:
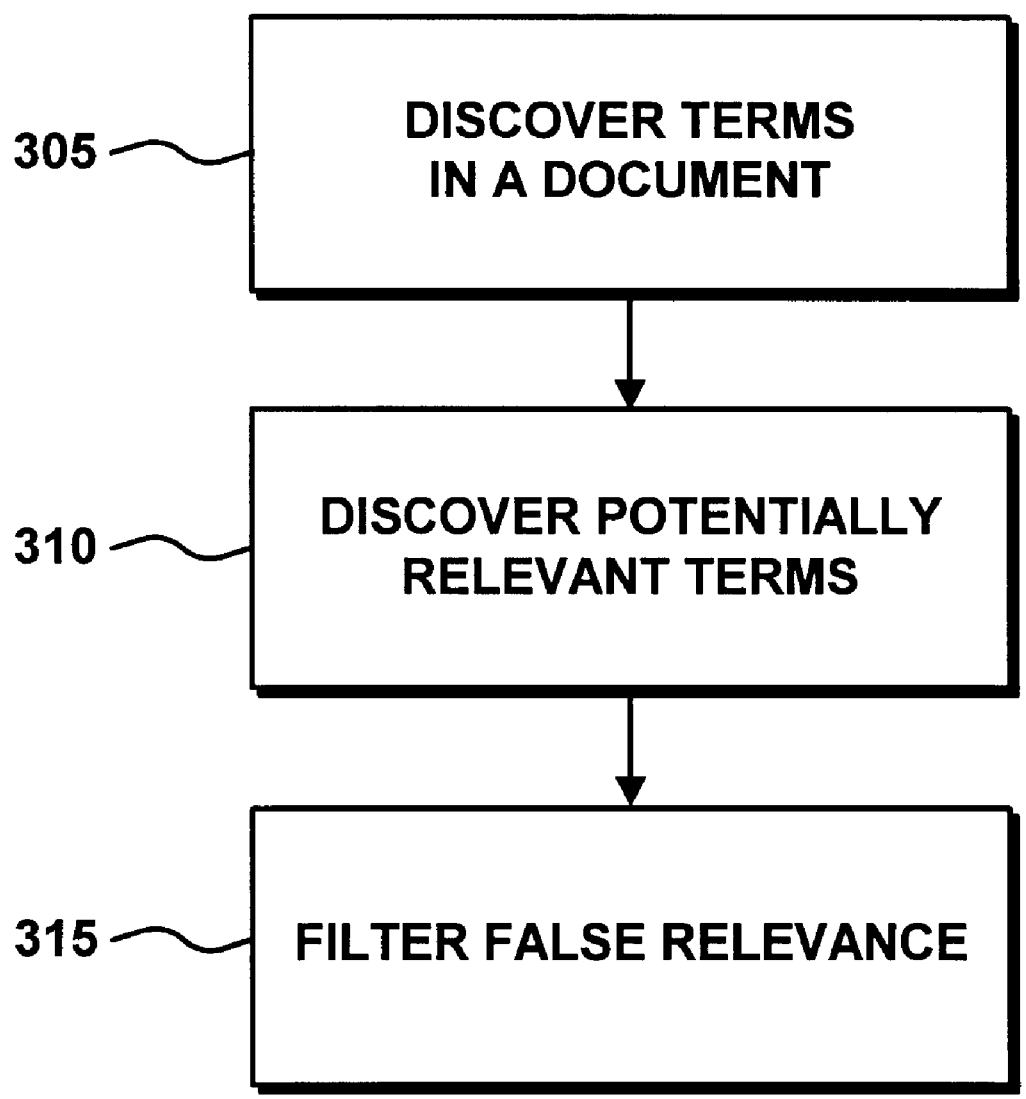
FIG. 9 is a flow chart that illustrates the operation of a preferred embodiment of the automatic mining system of FIG. 2.

With reference to FIG. 9, the operation of the automatic mining system 10 is represented by a process 300 that includes the three stages previously described. At block or step 305, the new terms discoverer 90 carries out the first stage of discovering the terms in a document $d_i$. The candidate terms discoverer 100 carries out the second stage of discovering potentially relevant terms at step 310. The relevant terms discoverer 110 carries out the third stage of refining or testing the discovered relevance to filter false (or insignificant) relevance, at step 315.

It is to be understood that the specific embodiments of the invention that have been described are merely illustrative of certain application of the principles of the present invention. Numerous modifications may be made to automatic mining system and associated methods described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system of automatically discovering terms in a document that are relevant to a given target topic, comprising:
   a new terms discoverer for identifying the terms in the document;
   a candidate terms discoverer for identifying potentially relevant terms from the terms identified by the new terms discoverer;
   the candidate terms discoverer comprising:
      an association module that performs a statistical analysis, regardless of an occurrence frequency of the terms within a single document; and
      a filtering module that filters association rules with relevance that surpasses a user specified threshold; and
   a relevant terms discoverer that identifies relevant terms by applying the association rules to the potentially relevant terms identified by the candidate terms discoverer, to refine a relevance of the potentially relevant terms by filtering false relevance.

2. The system according to claim 1, wherein the new terms discoverer includes a system for the automatic mining of patterns and relations.

3. The system according to claim 1, wherein the new terms discoverer includes a system for the automatic mining of new relationships.

4. The system according to claim 1, wherein the new terms discoverer includes a system for selecting new terms from relations.

5. The system according to claim 1, wherein the new terms discoverer includes a system for the automatic mining of patterns and relations, a system for the automatic mining of new relationships, and a system for selecting new terms from relations.

6. The system according to claim 2, wherein the system for the automatic mining of new relationships includes a knowledge module and a statistics module.

7. The system according to claim 6, wherein the knowledge module includes one or more of: a stemming unit, a synonym check unit, or a domain knowledge check unit.

8. The system according to claim 1, wherein the candidate terms discoverer includes a metadata extractor.

9. The system according to claim 8, wherein the candidate terms discoverer includes a document vector module, an association module, and a filtering module.

10. The system according to claim 9, wherein the candidate terms discoverer further includes a database for storing relevant terms.

11. The system according to claim 9, wherein the metadata extractor identifies hypertext link metadata in the document, and the document vector module creates a document vector for each document.

12. The system according to claim 1, wherein the relevant terms discoverer includes a stop word filter and a system for the automatic construction of a generalization hierarchy of terms.

13. The system according to claim 9, wherein the system for the automatic construction of the generalization hierarchy of terms includes an augmentation module, a generalization detection module, and a hierarchy database.

14. A system of automatically discovering terms in a document that are relevant to a given target topic, comprising:
   a new terms discoverer for identifying the terms in the document;
   a candidate terms discoverer for identifying potentially relevant terms from the terms identified by the new terms discoverer;
   the candidate terms discoverer comprising:
      an association module that performs a statistical analysis, regardless of an occurrence frequency of the terms within a single document; and
      a filtering module that filters association rules with relevance that surpasses a user specified threshold; and
   a relevant terms discoverer that identifies relevant terms by applying the association rules to the potentially relevant terms identified by the candidate terms discoverer, to refine a relevance of the potentially relevant terms by filtering false relevance.

15. The system according to claim 14, wherein the new terms discoverer includes a system for the automatic mining of patterns and relations, a system for the automatic mining of new relationships, and a system for selecting new terms from relations.

16. The system according to claim 15, wherein the system for the automatic mining of new relationships includes a knowledge module and a statistics module; and
   wherein the knowledge module includes one or more of: a stemming unit, a synonym check unit, or a domain knowledge check unit.

17. The system according to claim 15, wherein the candidate terms discoverer includes a metadata extractor, a document vector module, an association module, a filtering module, and a database for storing relevant terms; and
   wherein the system for the automatic construction of the generalization hierarchy of terms includes an augmentation module, a generalization detection module, and a hierarchy database.

18. A method of automatically discovering terms in a document that are relevant to a given target topic, comprising:
   identifying the terms in the document by means of a new terms discoverer;
   identifying potentially relevant terms from the terms identified by the new terms discoverer by means of a candidate terms discoverer that performs a statistical analysis, regardless of an occurrence frequency of the terms within a single document and that filters association rules with relevance that surpasses a user specified threshold; and identifying relevant terms by applying the association rules to the potentially relevant terms identified by the candidate terms discoverer, to refine a relevance of the potentially relevant terms by filtering false relevance, by means of a relevant terms discoverer.

19. The method according to claim 18, wherein identifying the terms includes automatically mining patterns and relations, automatically mining new relationships, and selecting new terms from relations.

20. The system according to claim 19, wherein automatically mining new relationships includes applying knowledge by means of a knowledge module, and applying a statistical analysis by means of a statistics module.

21. A computer usable medium having instruction codes for automatically discovering terms in a document that are relevant to a given target topic, comprising:

a first set of instruction codes for identifying the terms in the document;

a second set of instruction codes for identifying potentially relevant terms from the terms identified by the first set of instruction codes; for performing a statistical analysis regardless of an occurrence frequency of the terms within a single document; and for filtering association rules with relevance that surpasses a user specified threshold; and a third set of instruction codes that identifies relevant terms by applying the association rules to the potentially relevant terms identified by the second set of instruction codes, to refine a relevance of the potentially relevant terms by filtering false relevance.

22. The computer usable medium according to claim 21, wherein the first set of instruction codes comprises program codes for the automatic mining of patterns and relations, for the automatic mining of new relationships, and for selecting new terms from relations.

* * * * *